US008548721B2

(12) United States Patent  
Paillard et al.

(10) Patent No.: US 8,548,721 B2  
(45) Date of Patent: Oct. 1, 2013

(54) METHOD AND SYSTEM FOR MANEUVERING AN AIRCRAFT BY SHIFTING ITS CENTER OF GRAVITY

(75) Inventors: Pierre Paillard, Toulouse (FR); David Larcher, Fontenilles (FR)

(73) Assignee: Airbus Operations SAS, Toulouse (FR)

( * ) Notice: Subject to any disclaimer, the term of this patent is extended or adjusted under 35 U.S.C. 154(b) by 772 days.

(21) Appl. No.: 12/194,088

(22) Filed: Aug. 19, 2008

(65) Prior Publication Data  
US 2009/0088911 A1 Apr. 2, 2009

(30) Foreign Application Priority Data

Aug. 23, 2007 (FR) ...................................... 07 57147

(51) Int. Cl.  
*B64C 13/00* (2006.01)  
*B64C 17/00* (2006.01)  
*B64C 17/10* (2006.01)

(52) U.S. Cl.  
USPC .............. 701/124; 701/3; 244/75.1; 244/227; 244/99.2; 244/135 C

(58) Field of Classification Search  
USPC ................................................ 244/178–195  
See application file for complete search history.

(56) References Cited

U.S. PATENT DOCUMENTS

| 2,774,305 | A | | 12/1956 | Fitzgerald et al. |
| 4,937,754 | A | * | 6/1990 | Buisson et al. ............... 701/124 |
| 5,321,945 | A | * | 6/1994 | Bell ............................. 60/39.15 |
| 6,126,111 | A | * | 10/2000 | Burcham et al. ............ 244/76 R |
| 6,913,228 | B2 | * | 7/2005 | Lee et al. ................... 244/135 C |
| 7,350,749 | B2 | * | 4/2008 | Heaven et al. .................. 244/93 |
| 2001/0028018 | A1 | | 10/2001 | Darbyshire |
| 2005/0051666 | A1 | * | 3/2005 | Lee et al. ......................... 244/10 |
| 2007/0084511 | A1 | | 4/2007 | Johnson et al. |

FOREIGN PATENT DOCUMENTS

JP 04090997 A 3/1992

OTHER PUBLICATIONS

French Search Report dated Apr. 1, 2008.

* cited by examiner

*Primary Examiner* — Thomas Tarcza  
*Assistant Examiner* — Adam Tissot  
(74) *Attorney, Agent, or Firm* — Greer, Burns & Crain Ltd.

(57) ABSTRACT

A method to maneuver an aircraft in flight, in which the center of gravity of the aircraft is shifted by transferring fuel from at least one first fuel tank to at least one second fuel tank of the aircraft. A system implementing this method, the system including: at least one first fuel tank and at least one second fuel tank, a flight control unit capable of sending out a maneuver command upon being handled. A computer capable, as a function of this command, of determining a quantity of fuel to be transferred from the first tank to the second tank, at least one means of transfer connecting the first and second tanks and being controlled by the computer, to transfer the fuel from the first tank to the second tank.

12 Claims, 2 Drawing Sheets

METHOD AND SYSTEM FOR MANEUVERING AN AIRCRAFT BY SHIFTING ITS CENTER OF GRAVITY

FIELD

The disclosed embodiments relate to a method for maneuvering an aircraft by shifting its center of gravity by means of a transfer of fuel between the different fuel tanks of said aircraft. The disclosed embodiments also relate to a system for implementing this method.

The disclosed embodiments can be applied in aeronautics and especially in the field of the piloting controls of an aircraft to improve the maneuverability of the aircraft, especially in the event of malfunctioning of classic actuators.

DESCRIPTION OF RELATED DEVELOPMENTS

In aeronautics, aircraft and especially passenger aircraft must comply with important security conditions. Indeed, aircraft builders try to foresee every possible malfunction of equipment that could jeopardize flight and seek to set up means of coping with all these different malfunctions. This is the case especially with the different aircraft maneuvering systems. Usually, to maneuver an aircraft, the pilot uses flight controls such as the control column to control the mechanical actuators. These mechanical actuators have the role of shifting the aerodynamic surfaces of the aircraft, the shifting of these aerodynamic surfaces giving rise to a maneuver by the aircraft.

The maneuvering means available to the pilot include especially aerodynamic surfaces capable of moving on the wings of the aircraft. For example, the pilot can use the ailerons situated at the ends of the wings to obtain a lateral inclination. He can use the spoilers on the upper surface of the aircraft wings or the leading edges situated on the lower surface of the aircraft wings to modify the lift of the wing. The pilot can also use the fin situated on the aircraft stabilizer to modify the yaw of the aircraft, i.e. the path in the horizontal plane of the aircraft.

The different aerodynamic surfaces of an aircraft are used to maneuver the aircraft both in its horizontal plane and in its vertical plane. These surfaces are used especially to obtain:

a roll motion of the aircraft, i.e. a motion of rotation of the aircraft about its longitudinal axis, or a pitch motion of the aircraft, i.e. a motion of longitudinal inclination in the vertical plane of the aircraft.

The pitch motion is generally obtained by modifying the attitude of the aircraft, i.e. the longitudinal inclination of the aircraft. The attitude can be modified so as to create a nose-up motion in which the aircraft moves skyward or a nose-down motion in which the aircraft moves towards the ground relative to a horizontal axis.

The aerodynamic surfaces that enable these different yaw, pitch and roll motions are each shifted by means of at least one mechanical actuator. These mechanical actuators are generally powered by hydraulic and/or electrical circuits.

For the safety reasons mentioned here above, the hydraulic and electrical power circuits of the mechanical actuators are generally duplicated. This redundancy of the power circuits enables rapid and simple replacement of a malfunctioning power circuit.

However, it can happen that the redundant hydraulic and electrical power circuits are also defective. In this case, with a classic maneuvering system, the pilot no longer has any means to maneuver the aircraft.

Furthermore, it can happen that aerodynamic surfaces get externally damaged, for example following a hailstorm, a collision with a bird etc. In this case, the aircraft is deprived of at least part of its maneuvering means, thus preventing the pilot from maneuvering the aircraft efficiently.

In both these cases, where the pilot can no longer use the aerodynamic surfaces of the aircraft, the pilot can use the thrust of the jet engines as his ultimate means of controlling the motions of the aircraft. Indeed, by subjecting the jet engines situated on one side of the aircraft to varying degrees of thrust relative to the other side, the aircraft can be made to perform motions in the horizontal and/or vertical plane. However if, through mishap, one or more of the aircraft jet engines should also be damaged, for example in the event of a hailstorm, then the pilot will no longer have any means to control the motion of the aircraft in order to attempt a landing or splash-down. The aircraft therefore will longer be maneuverable.

Furthermore, for economical reasons, aircraft manufacturers are seeking to achieve maximum reductions in fuel consumption. Now, in normal operation, when aircraft are in motion, their aerodynamic surfaces counter the airflow around the aircraft. Besides, it is this countering of the airflow that conventionally enables a lateral or vertical maneuver on part of the aircraft. However, this countering of the airflow gives rise to aerodynamic drag which increases fuel consumption by the aircraft.

SUMMARY

The disclosed embodiments are aimed precisely at overcoming the drawbacks of the above-described techniques. To this end, the disclosed embodiments propose a method and a system to control the roll and the pitch of an aircraft without using the aerodynamic surfaces, in shifting its center of gravity. According to the disclosed embodiments, the center of gravity of the aircraft is shifted by modifying the distribution of the fuel on board the aircraft between the different fuel tanks of said aircraft. In other words, the disclosed embodiments propose a system to transfer fuel from at least one tank to at least another tank of the aircraft in order to shift its center of gravity and thus maneuver the aircraft by means of the mass of the fuel.

More specifically, the disclosed embodiments relate to a method to maneuver an aircraft in flight, the method consisting in shifting the center of gravity of the aircraft by transferring fuel from at least one first fuel tank to at least one second fuel tank of the aircraft.

The method of the disclosed embodiments may comprise one or more of the following characteristics:

when a maneuver command is sent out by a pilot, a computer of the aircraft determines a quantity of fuel to be transferred.

the computer of the aircraft verifies that the quantity of fuel to be transferred is smaller than predetermined values of maximum quantities of fuel transferable to protect the flight envelope.

the fuel is transferred from a right lateral tank to a left lateral tank or vice versa to create a roll motion of the aircraft.

the fuel is transferred from a central tank to a rear tank or vice versa to create a pitch motion of the aircraft.

The disclosed embodiments also relate to a system for maneuvering an aircraft in flight that implements the above-mentioned method. This system comprises a flight control that can be handled by a pilot and is capable, during this handling, of sending out a maneuvering command. This system is characterized by the fact that it comprises:

at least one first fuel tank and at least one second fuel tank, a computer capable of receiving the maneuvering command and, as a function of this command, of determining a quantity of fuel to be transferred from the first tank to the second tank, and at least one means of transfer connecting the first and second tanks and being controlled by the computer to transfer the fuel from the first tank to the second tank.

The system of the disclosed embodiments may comprise one or more of the following characteristics:

it comprises at least two lateral tanks communicating with one another by means of a lateral transfer means.

the lateral tanks are laid out in the wings.

it has at least one central tank and one rear tank communicating with each other through a longitudinal transfer means.

The disclosed embodiments also relate to an aircraft comprising a system as described here above.

DETAILED DESCRIPTION OF EMBODIMENTS

The disclosed embodiments propose a method enabling the aircraft to be maneuvered in a vertical plane or in a horizontal plane by shifting its center of gravity. The center of gravity of an aircraft can be modified by shifting the relative mass of the fuel on board the aircraft.

Indeed, any aircraft in flight carries a substantial quantity of fuel. For reasons of security, the quantity of fuel taken on board is greater than the estimated quantity of fuel needed to carry out its mission. Indeed, regulations require that each aircraft should carry a margin of extra fuel in order to cope with unexpected events. On the whole, the regulations stipulate that an aircraft should carry 10% of additional fuel relative to the estimated quantity needed for the flight, in addition to a margin equivalent to half-an-hour's flight. It can therefore be deemed to be the case that, in general, a part of the total mass of the aircraft is constituted by fuel. The location of the center of gravity of the aircraft therefore depends on this mass. The shifting of this mass therefore enables the position of the center of gravity of the aircraft to be modified.

An aircraft generally has several fuel tanks. It usually has one lateral fuel tank situated in the wing. This tank is divided into several compartments, thus creating a right lateral tank in the right wing of the aircraft and a left lateral tank in the left wing of the aircraft.

An aircraft generally has a central tank situated in the fuselage of the aircraft. Most aircraft additionally have a rear fuel tank situated in the fuselage behind the central tank (the rear of the aircraft being that part of the fuselage of the aircraft which is opposite the cockpit).

According to the disclosed embodiments, the fuel can be transferred from one tank to another tank, especially from the right lateral tank to the left lateral tank or vice versa and from the central tank to the rear tank or vice versa.

To this end, the disclosed embodiments, in addition to the tanks, comprises fuel transfer pumps. In particular, it has a lateral pump to transfer fuel from one lateral tank to another lateral tank and a longitudinal pump to transfer fuel from a rear tank to the central tank, or vice versa.

Figure 1:
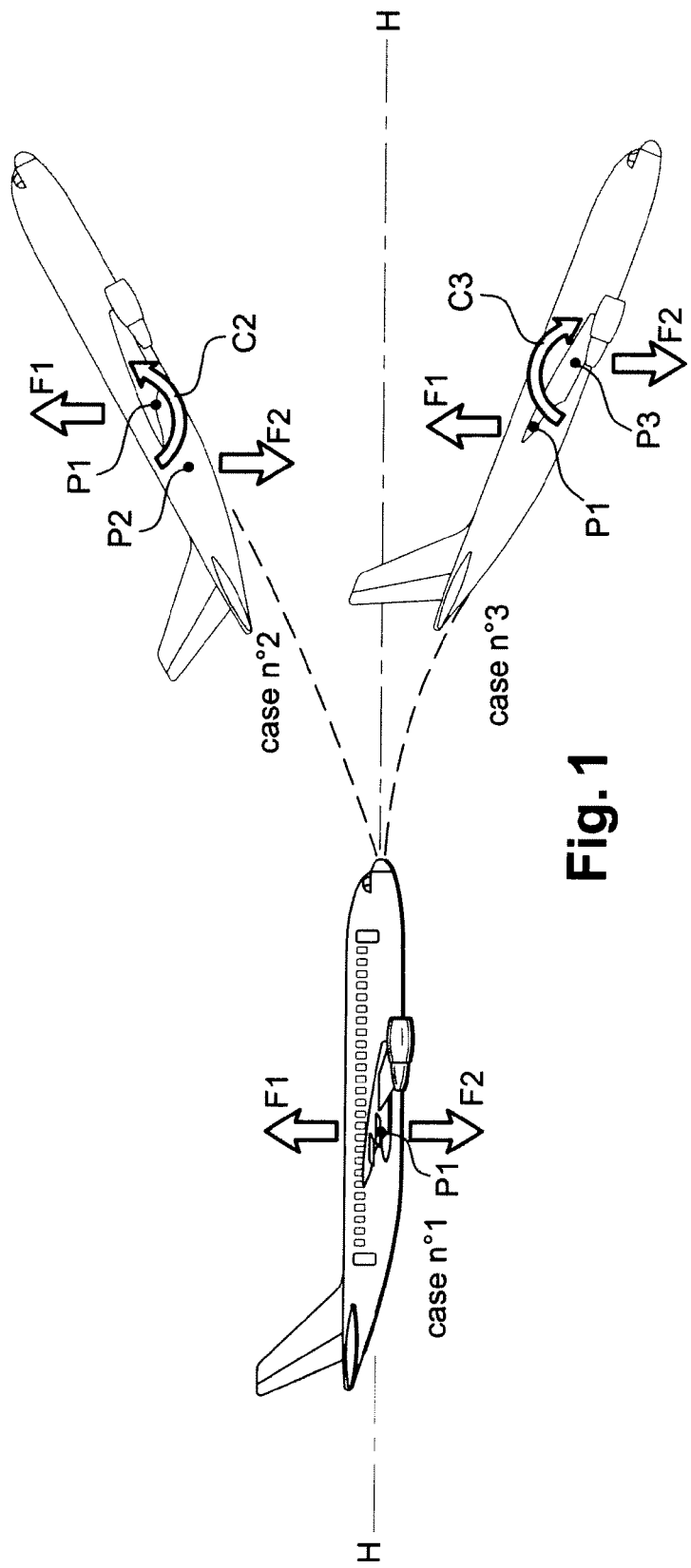
FIG. 1 shows examples of an aircraft pitch control achieved by fuel transfer.

FIG. 1 shows different examples of the positioning of the center of gravity of a same aircraft. In a first example of an aircraft called case No. 1, the gravitational force F2 and the lift F1 are balanced and both applied to the central point P1. The center of gravity of the aircraft is therefore centered on the position P1. In this case No. 1, the aircraft flies at a constant altitude.

In case No. 2 of FIG. 1, the aircraft is in a nose-up position. To obtain a nose-up attitude, the disclosed embodiments propose to transfer at least one part of the fuel from the central tank of the aircraft to the rear tank of said aircraft. This has the consequence of shifting the relative mass of the fuel towards the rear of the aircraft, thus shifting the gravitational force F2 towards the position P2 located behind the position P1. The lift force F1 for its part remains in the position P1. It will therefore be understood that the gravitational force F2 and the lift force F1 together form a pair of forces C2 that modify the attitude of the aircraft. In the case No. 2 of FIG. 1, the pair C2 is a nose-up pair enabling the aircraft to climb, i.e. to move skyward so as to form a positive angle with the horizontal axis H.

In the case No. 3 of FIG. 1, the aircraft is in a nose-down position. To obtain such a nose-down attitude, the disclosed embodiments propose to transfer at least one part of the fuel from the rear tank of the aircraft to the central tank of said aircraft. This has the consequence of shifting the relative mass of fuel to the front of the aircraft, thus shifting the gravitational force F2 towards the position P3 located in front of the position P1. The lift force F1 for its part remains at the position P1. It can therefore be understood that the gravitational force F2 and the lift force F1 together constitute a pair of forces C3 that modify the attitude of the aircraft. In the case No. 3 of FIG. 1, the pair C3 is a nose-down pair enabling the aircraft to be made to dive towards the ground, i.e. to move earthwards so as to form a negative angle with the horizontal axis H.

Thus, by a transfer of all the fuel or only one part of the fuel from the central fuel tank to the rear fuel tank or vice versa, the aircraft is made to undergo a pitch motion in the vertical plane of the aircraft, respectively skyward or towards the ground.

Figure 2:
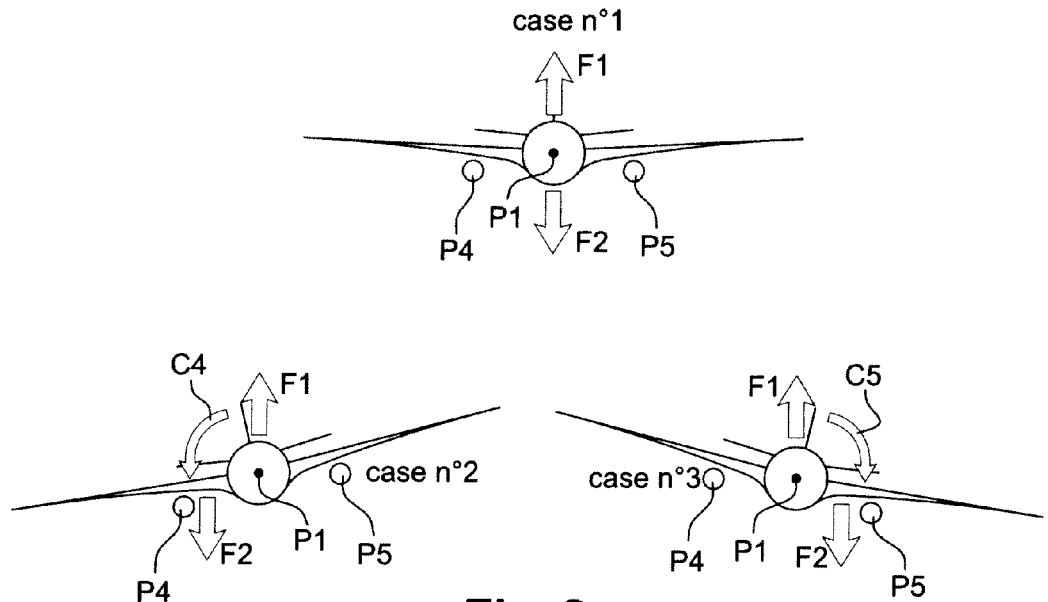
FIG. 2 shows examples of an aircraft roll control achieved by fuel transfer.

FIG. 2 shows an aircraft in the case of a transfer of fuel between the two lateral tanks. In the case No. 1 of FIG. 2, an aircraft is shown when the fuel is distributed in a balanced way between the two lateral tanks. In this case, the gravitational force F2 and the lift force F1 of the aircraft are balanced and are both applied to the central point P1. The center of gravity of the aircraft is therefore centered on the position P1. In this case No. 1 of FIG. 2, the aircraft has a horizontal path, i.e. it is flying in a horizontal direction.

In the case No. 2 of FIG. 2, fuel is transferred from the left lateral tank of the aircraft to the right lateral tank of said aircraft. The consequence of this is that the relative mass of the fuel is shifted towards the right of the aircraft, thus shifting the gravitational force F2 towards the position P4 situated to the right of the position P1 (since the aircraft is shown in a frontal view in FIG. 2, the right-hand side of the aircraft is situated at the left-hand side of FIG. 2). The center of gravity of the aircraft then shifts to its right. The lift force F1 for its part remains at the position P1. It can therefore be understood that the gravitational force F2 and the lift force F1 together form a pair of forces C4 which draw the aircraft rotationally relative to its longitudinal axis. The aircraft thus performs a rolling rightward motion.

In the case No. 3 of FIG. 2, the fuel is transferred from the right lateral tank to the left lateral tank of the aircraft. This has the consequence of shifting the relative mass of the fuel towards the left of the aircraft, thus shifting the gravitational force F2 to the position P5 situated to the left of the position P1 (since the aircraft is shown in a frontal view in FIG. 2, the left side of the aircraft is situated at the right-hand side of the figure). The center of gravity of the aircraft then shifts to the left of the aircraft. The lift force F1 for its part remains at the position P1. It can therefore be understood that the gravitational force F2 and the lift force F1 together form a pair of forces C5 which drive the aircraft in a rotational motion relative to its longitudinal axis. The aircraft thus performs a leftward roll motion.

Once the aircraft has reached the desired inclination, the fuel may be retransferred to the other lateral, central or rear tanks so that the mass of fuel is balanced.

In one embodiment, it is possible to use only a transfer of fuel between two tanks and combine the maneuver thus obtained with a maneuver obtained by traditional means, such as the shifting of aerodynamic surfaces. The method of the disclosed embodiments can then be used in normal piloting mode to perform small corrections in direction. For example, a transfer between the two lateral tanks for example to obtain a roll motion, may be combined with the use of the rudder which for its part makes it possible to obtain a yawing motion of the aircraft. In this case, the transfer of fuel substantially replaces the use of the ailerons.

In another embodiment, a transfer of fuel between the two lateral tanks and a transfer of fuel between the rear and central tanks enables a combination of a roll maneuver and a pitch maneuver. This embodiment can also be used as a back-up mode for the aircraft, for example in the event of malfunctioning of the aerodynamic surfaces and of the jet engines. This embodiment can also be used in normal operation of the aircraft. It then substantially reduces fuel consumption by the aircraft because the shifting of the aerodynamic surfaces is reduced or is non-existent, which reduces or cancels out the drag prompted by these surfaces.

In the disclosed embodiments, the transfer of fuel between two tanks is managed by a computer of the aircraft, for example an embedded computer. Thus, when the pilot wishes to maneuver the aircraft, he uses a classic onboard control unit of the aircraft, for example the control column. The maneuvering command is then transmitted to the embedded computer. This computer determines the tanks concerned by the type of motion (roll or pitch) requested. It also determines the quantity of fuel to be transferred from one tank to another to obtain the angle of inclination requested by the police. The determining of the quantity of fuel to be transferred takes account of the different parameters of the aircraft such as the operation mode of the aircraft (normal piloting mode, back-up mode), the initial position of the aircraft (roll, pitch), the distribution of masses of the fuel at the time when the control is used and the value set by the pilot (the greater the difference between this set value and the position of the aircraft, the greater the quantity of fuel that has to be transferred). The operation mode of the aircraft may be determined either automatically, for example upon reception of a malfunctioning control from one or several engines and/or classical maneuver means, or manually upon instruction from the pilot.

The embedded computer then commands the fuel pumps which transfer fuel between the tanks.

The system of the disclosed embodiments therefore has fuel tanks and transfer pumps as explained here above. It also has at least one onboard control unit to control the maneuvers of the aircraft and a computer to determine the type of transfer to be made, whether lateral and longitudinal, and the quantity of fuel to be transferred. It also has a memory storing values of the maximum quantities of fuel that can be transferred. These values of maximum quantities of fuel that can be transferred are predetermined and depend on the model of the aircraft.

Indeed, it can be clearly understood that a transfer of an excessive quantity of fuel can result in an excessive tilt of the aircraft which could lead to a crash. Thus, when the computer has determined the quantity of fuel to be transferred, it ascertains that this quantity of fuel is within the possible limits of transfer which have been stored in memory. In other words, in order to ensure the maneuverability and stability of the flight, the pilot uses his usual flight controls which, in the disclosed embodiments, are processed by a computer so as to regulate the transfer of fuel while at the same time protecting the limits of balance within which the aircraft is controllable.

It is possible in normal operation to maneuver the aircraft entirely without using any aerodynamic surfaces other than the tail. The result of this is a substantial gain in fuel consumption owing to the absence of drag as explained here above.

Figure 3:
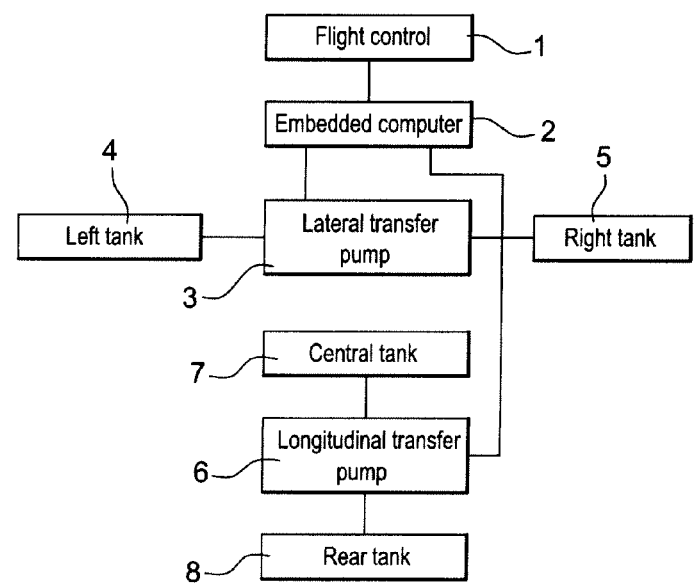
FIG. 3 is a schematic view of an architecture of the maneuvering system according to the disclosed embodiments.

In the event of total failure of the aerodynamic surfaces, the transfer of fuel enables the control of the aircraft to be maintained in order to attempt a landing or splash-down even if one or more jet engines have just gone out of operation, FIG. 3 shows an example of architecture of the system of the disclosed embodiments. In this system, the embedded computer 2 is connected to the flight control 1 of the aircraft. FIG. 3 shows that the computer 2 is connected to a lateral transfer pump 3 and to a longitudinal transfer pump 6. The lateral pump 3 ensures a link between the right lateral tank 5 and the left lateral tank 4. The longitudinal pump 6 ensures a link between the central tank 7 and the rear tank 8.

In the system of the disclosed embodiments, the flight control 1 is a classic aircraft control unit. The method implemented to maneuver the aircraft is therefore transparent to the pilot who acts on classic flight control units. It is the embedded computer that manages the transfer of fuel to improve or simply to obtain an inclination of the aircraft.

What is claimed is:

1. A method of maneuvering an aircraft in flight, in a normal flight operation mode operating within a predetermined authorized flight envelope, by shifting a center of gravity of the aircraft, the aircraft having a plurality of fuel tanks, including at least two lateral fuel tanks on opposite sides of a longitudinal centerline of the aircraft, a central fuel tank and a rear fuel tank and an onboard control unit operated by a pilot to effect maneuvers of the aircraft, the method of maneuvering being accomplished via a computer of the aircraft comprising the steps of:
   receiving a control signal from the onboard control unit relating to a pilot requested maneuver to change at least one of a roll and pitch orientation of the aircraft,
   determining a quantity of fuel to be transferred from one fuel tank in the aircraft to another fuel tank in the aircraft to achieve the requested maneuver,
   verifying that the quantity of fuel required to be transferred does not exceed predetermined values of maximum quantities of fuel transferable to protect the flight envelope of the aircraft.

2. A system for maneuvering an aircraft in flight comprising a flight control that can be handled by a pilot and is capable, during this handling, of sending out a maneuvering command,
   the system comprising:
   at least one right lateral fuel tank, one left lateral fuel tank, one central fuel tank and one rear fuel tank,
   a computer configured to receive the maneuvering command and, as a function of this command, to determine a quantity of fuel to be transferred longitudinally or laterally from a first tank to a second tank, as well as the tanks concerned by the transfer of fuel, while taking into account of a type of pitch and/or roll maneuver to be performed, and to verify that the quantity of fuel required to be transferred does not exceed predetermined values of maximum quantities of fuel transferable to protect the flight envelope of the aircraft, and at least one arrangement of a conduit and pump connecting the first and second tanks and being controlled by the computer, to transfer the fuel longitudinally or laterally from the first tank to the second tank.

3. A system according to claim 2, wherein the lateral tanks are laid out in the wings.

4. A system according to claim 2, wherein the central tank and the rear tank communicate with each other through a longitudinally extending conduit.

5. An aircraft comprising a maneuvering system according to claim 2.

6. The method of claim 1, including the step of transferring fuel from one lateral fuel tank to another lateral fuel tank to create a roll motion of the aircraft, if requested.

7. The method of claim 1, including the step of transferring fuel from one central tank to a rear fuel tank to create a pitch motion of the aircraft, if requested.

8. The method of claim 1, wherein the step of determining a quantity of fuel includes determining which fuel tank the fuel is to be drawn from and determining which fuel tank the fuel is to be transferred to.

9. The method of claim 1, including the step of associating the transfer of fuel to shift the center of gravity of the aircraft with a shifting of aerodynamic surfaces of the aircraft such that a part of the requested maneuver is accomplished by the transfer of fuel to shift the center of gravity of the aircraft and a part of the requested maneuver is accomplished by the shifting of the aerodynamic surfaces of the aircraft.

10. The method of claim 1, further including also maneuvering the aircraft in a back-up mode of the aircraft wherein at least one of an aerodynamic surface of the aircraft and an engine of the aircraft is malfunctioning, following the steps of claim 1.

11. A system according to claim 2, wherein the right lateral tank and the left lateral tank communicate with one another by a laterally extending conduit.

12. The system according to claim 2, wherein the computer is further configured to associate the transfer of fuel with a shifting of aerodynamic surfaces of the aircraft such that a part of the requested maneuver is accomplished by the transfer of fuel to shift the center of gravity of the aircraft and a part of the requested maneuver is accomplished by the shifting of the aerodynamic surfaces of the aircraft.

\* \* \* \* \*